United States Patent
Bird et al.

[15] 3,688,794
[45] Sept. 5, 1972

[54] EXHALATION VALVE FOR RESPIRATOR

[72] Inventors: Forrest M. Bird; Henry L. Pohndorf, both of c/o P.O. Box 817, Sandpoint, Idaho 83864

[22] Filed: Aug. 10, 1970

[21] Appl. No.: 62,343

[52] U.S. Cl. ............... 137/529, 128/146.4, 137/542, 251/82
[51] Int. Cl. .............................................. F16k 15/18
[58] Field of Search..128/145.5, 145.8, 146.4, 146.5; 137/102, 529, 63 R, 542; 251/82, 83

[56] References Cited

UNITED STATES PATENTS

| | | |
|---|---|---|
| 3,444,857 | 5/1969 | Godel ................. 128/146.4 X |
| 1,942,417 | 1/1934 | Ferlin et al ............. 137/542 X |
| 2,567,224 | 9/1951 | McKee et al. .......... 128/146.5 |
| 2,839,054 | 6/1958 | Kindred ................. 128/146.5 |

FOREIGN PATENTS OR APPLICATIONS

| | | |
|---|---|---|
| 869,075 | 7/1949 | Germany .................... 137/542 |

*Primary Examiner*—Robert G. Nilson
*Attorney*—Flehr, Hohbach, Test, Albritton & Herbert

[57] ABSTRACT

An improved exhalation valve for a mechanical respirator. The valve includes valving elements combined in a cartridge adapted for ready insertion and removal into a valve housing for convenient assembly and disassembly. A valve closure member in the cartridge occludes the exhalation flow path in a manner decreasing flow turbulence and valve flutter. The valve head on the closure member is formed by a surface of revolution generated by a curve of constant radius, and includes a cylindrical skirt adapted for axial aligning, non-binding movement with respect to longitudinal ribs formed on a central support. The closure member is operated by a plunger molded on the hub of a gas-operated diaphragm, and the plunger releaseably locks into a split intrusive ring on a hollow stem of the closure member in a lost-motion connection.

11 Claims, 2 Drawing Figures

INVENTORS
FORREST M. BIRD
HENRY L. POHNDORF

BY Flehr, Hohbach, Vest,
Albritton & Herbert
ATTORNEYS

EXHALATION VALVE FOR RESPIRATOR

BACKGROUND OF THE INVENTION

This invention relates in general to apparatus for use with mechanical respirators in the field of pulmonary therapy, and in particular relates to exhalation valves in mechanical respirators having an inhalation phase and an exhalation phase in their operative cycle.

Exhalation valves have been provided in respirators of the type described to occlude the exhalation passageway from the patient during the inhalation phase and to open this passageway during the exhalation phase.

Problems which have arisen with existing exhalation valves have largely been created by the expanding art and demand, rather than a failure of mechanical function. One problem which has developed involves the fact that relatively unskilled individuals are increasingly called upon to operate and maintain respirators of the type described. As a result, existing exhalation valves may be easily broken, improperly maintained, or incorrectly assembled after sterilization. The valves thus are subject to malfunction to a greater degree.

Another problem encountered with conventional exhalation valves is where the valves are used for indirectly ventilating the lungs through a bellows, pneumatic bag or diaphragm. As terminal expiratory gas flows are reached the valve closure member often develops a harmonic rebound phenomenon between balanced spring loading, frictional wall forces, and expiratory gas flows. The expedient of increasing the force required to be overcome for opening the closure member is not satisfactory inasmuch as the increased physiological opening pressures would lead to elevated mean intrathoracic pressures with associated alterations to cardiopulmonary dynamics.

Accordingly, the need has been recognized for an improved exhalation valve in a mechanical respirator which is relatively small and inexpensive, is adaptable for use and maintenance by relatively inexperienced personnel, is comprised of a relatively few number of parts in a compact assembly, and which minimizes flutter and chatter problems associated with expiratory flow.

SUMMARY OF THE INVENTION AND OBJECTS

It is an object of the invention to provide an improved exhalation valve for a mechanical respirator which is simple to use and maintain by relatively inexperienced personnel.

Another object is to provide an exhalation valve of the type described which is comprised of relatively inexpensive parts adapted for ready assembly and disassembly as a cartridge unit into and from an exhalation valve housing.

Another object is to provide an exhalation valve of the type described incorporating a fewer number of component elements as compared to existing valves.

Another object is to provide an exhalation valve of the type described adapted to minimize flutter and chatter of the valve closure member during expiratory flow.

Another object is to provide an exhalation valve of the type described incorporating a valve closure member designed to afford more positive valving action of the expiratory passageway without a tendency towards sticking or binding between the moving elements.

The foregoing and other objects and features are provided in the present invention by an exhalation valve apparatus connectable with the mainstream passageway of a mechanical respirator having an inhalation phase and an exhalation phase in its operative cycle. A housing having an inlet adapted to be connected with the respirator receives a removable cartridge comprising the valving elements. The cartridge includes a central support mounted in a chamber and having a distal end spaced from a valve seat in the expiratory flow path. A plunger molded at one end with the hub of a gas operated flexible diaphragm is releasably mounted by a lost-motion connection on a split hollow stem of the closure member. The closure member is guided for axially sliding movement to occlude the valve seat during the inspiratory phase by means of a cylindrical skirt cooperating with a plurality of longitudinal ribs formed on the outer periphery of the central support. Spring means are provided to yieldably urge the closure member against the valve seat to provide the threshold valve closing force, and gas pressure acting against the diaphragm operates the plunger to move the closure member to its seated position occluding the valve seat during the inspiratory phase.

DESCRIPTION OF THE PREFERRED EMBODIMENT

Figure 1:
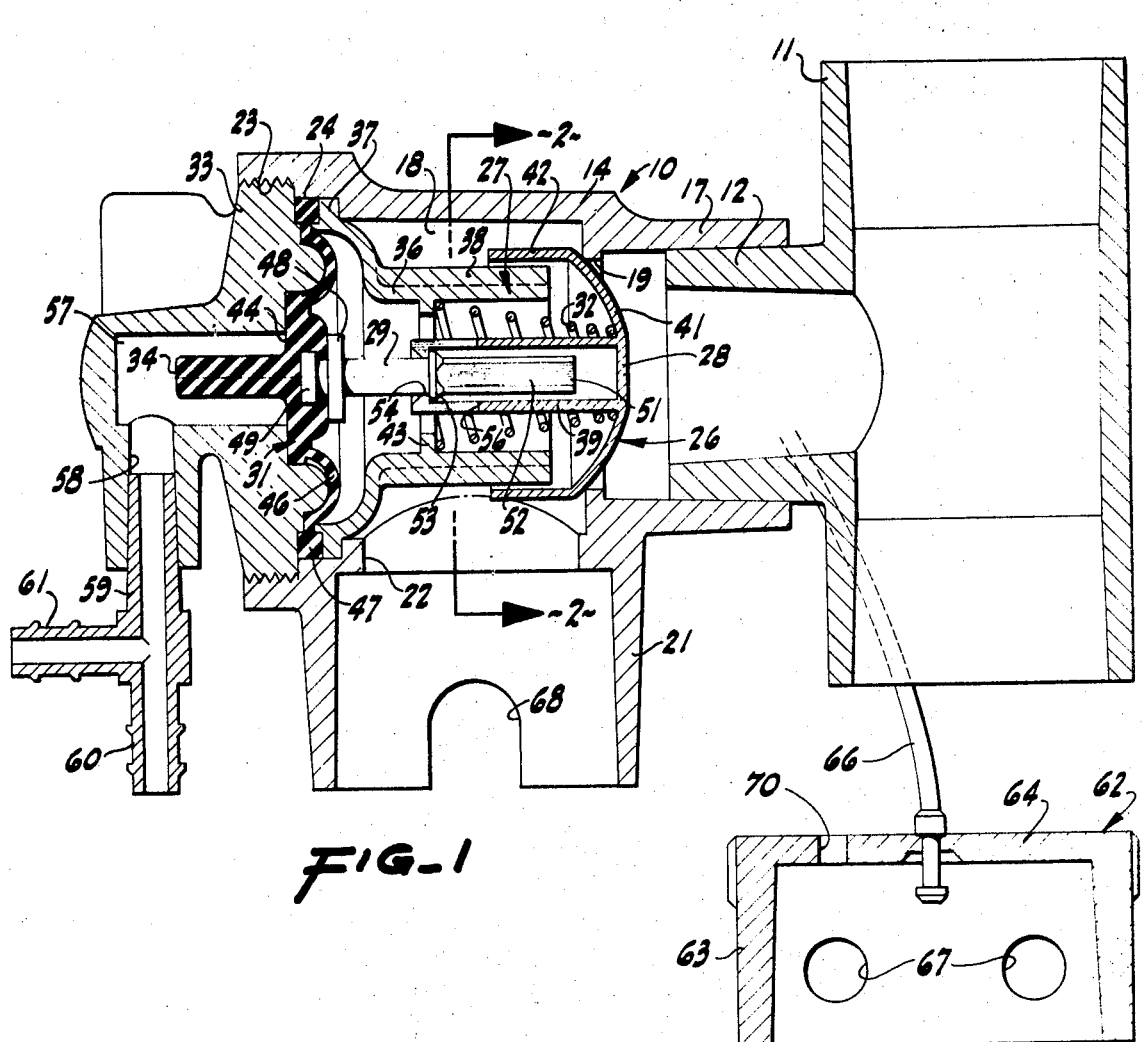
FIG. 1 is an elevational view in cross-section of an expiratory valve apparatus incorporating features of the invention; and, FIG. 2 is a cross-sectional view taken along the line 2—2 of FIG. 1.
Figure 2:
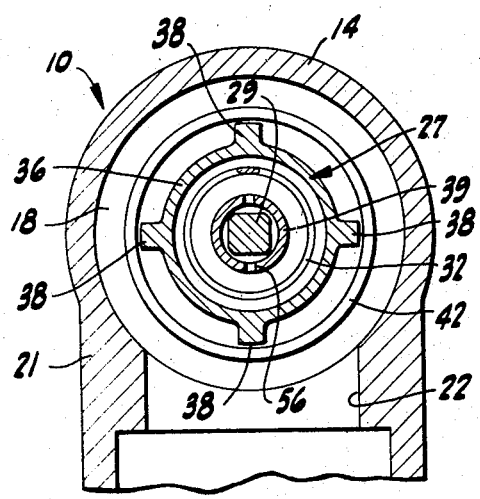

In the drawings, FIG. 1 illustrates generally at 10 a preferred embodiment of the exhalation valve apparatus of the invention. Exhalation valve apparatus 10 is adaptable for use and operation with existing mechanical respirators of the type having an inhalation phase and an exhalation phase in their operative cycle. As such, a respirator of this type would typically incorporate a Tee 11 defining the mainstream flow passageway from the main flow control unit and nebulizer assembly, not shown, into a suitable patient adaptor, not shown, connectable with the airway of the patient. During the exhalation phase, the expired gases entering Tee 11 from the patient adaptor exhaust through cylindrical port 12 into exhalation valve apparatus 10.

Exhalation valve apparatus 10 comprises a main housing 14, preferably molded from a suitable synthetic plastic material, provided with an integral cylindrical inlet port 17 adapted for an external press fit with Tee exhaust port 12. Housing 14 defines an internal chamber 18 communicating at one end with inlet 17 through circular valve seat 19 and at its side with a cylindrical outlet 21 through outlet port 22. The end of housing 14 opposite that of valve seat 19 is provided with an internally threaded opening 23 and a counterbored, aligned opening 24 adapted for the rapid insertion and removal of a cartridge 26 which serves as the valve closure means.

Valve cartridge 26 comprises a central support 27, valve closure member 28, plunger 29, flexible diaphragm 31, and coiled compression spring 32. In the illustrated assembled relationship cartridge 26 is locked in position by means of a valve cap 33 provided with external threads at its circular rim adapted for engagement with the internal threads of housing opening 23. Cartridge 26 is easily removed as a unit for subsequent cleaning and sterilization of its component parts by first unscrewing valve cap 33 and then withdrawing the cartridge by grasping and pulling on a projecting handle 34 formed integral with diaphragm 31, thereby pulling as a unit all elements of the cartridge from the housing in a manner explained hereafter.

Central support 27 is formed with a cylindrical body 36 mounted within housing chamber 18 through an outer, integral rim 37 seated within counterbored or recessed opening 24. A plurality of longitudinally extending ribs 38 are formed on the outer periphery of support body 36 to function as a guide for axially aligning closure member 28. Closure member 28 includes an open-ended hollow valve stem 39 formed integral with a rounded valve head 41 which in turn is formed with a rearwardly extending cylindrical skirt 42. Skirt 42 is formed with a suitable radial clearance between its inside wall and the outer surfaces of ribs 38 to precisely guide the valve closure member with minimal frictional loading during relative translatory movement therebetween. This precludes binding of the valve closure member and protects the moving parts from foreign matter to insure proper operating movement of the valve closure member. Moreover, the provision of ribs 38 contributes to reducing the tendency towards valve flutter during terminal expiratory flows by providing a more patent, passive closing action.

Flow turbulence through the exhalation valve is also reduced for minimizing flutter through the geometry of valve head 41. The external surface of this valve head is defined by a surface of revolution generated by a curve of constant radius convex with respect to valve seat 19. The flow of gases over this curved surface is thus substantially laminar so that the pressure forces on the closure member do not create flutter.

Coiled compression spring 32 is mounted within the central bore of support 27 and it is seated at one end against internally projecting flange 43 with its other end bearing against valve head 41. Spring 32 yieldably urges closure member 28 in seating relationship against valve seat 19 with a predetermined seating force. This force is the valve threshhold closing force against which the expiratory gases act as they exhaust through valve 10 during the expiratory phase.

During the inspiratory phase closure member 28 occludes valve seat 19 to prevent escape of inspiratory gases. The closure member is held in its seated position through the action of gas-operated diaphragm 31 and plunger 29. Diaphragm 31 is molded from a suitable elastomer material and defines a central hub 44 integral with projecting handle 34 and flexible, rounded wall 46. An annular rim 47 integral with the outer periphery of wall 46 seats the diaphragm in position between support rim 37 and valve cap 33. Plunger 29 is formed at its proximal end with a flange or abutment 48 and projecting stub end 49 which is axially aligned with and fused within diaphragm hub 44 for constrained movement therewith. The distal end 51 of the plunger is formed with a plurality of flat side surfaces 52, shown as four, defining four edges to provide substantially line bearing contact for translatory movement with the inner surface of valve stem 39.

Displacement of diaphragm 31 to the right creates a tension or elastic force in the distorted or upset convoluted diaphragm wall tending to return the same to the illustrated relaxed neutral position. As an alternative the diaphragm may be molded to provide these return tension forces in the neutral position, i.e. the tension forces would exist without change of diaphragm position with relation to seat 19.

Plunger 29 is connected with valve stem 39 through a lost-motion connection affording a range of axial movement between the two parts while at the same time capturing the elements of the valve cartridge so that they can be removed as a unit from the housing. A shoulder or abutment 53 formed on plunger 29 is spaced from flange 48 to define the limit of travel between the closure member and plunger. Valve stem 39 is formed with an intrusive annulus 54 at its distal end, and this end is split by providing one or more slots 57, preferably by a pair of diametrical slots. This permits the end of the valve stem to be assembled on the plunger rod by force-expanding over shoulder 53, after which the split-apart stem sides snap back to lock in place. Where it is desired to withdraw the cartridge for disassembly diaphragm handle 34 is grasped and pulled so that an axial pulling force is exerted through plunger 29, closure member 28, coil spring 32, and central support 27 upon engagement thereof by the closure member. With the cartridge removed its component elements are separated for sterilization by pulling the closure member and diaphragm handle apart until stem annulus 54 expands open and separates from plunger shoulder 53.

Diaphragm 31 is operated during the inspiratory pressure by means of gas pressure directed into a chamber 57 formed in valve cap 33. An inlet port 58 directs gas into the chamber from a suitable fitting 59. This fitting communicates with a gas source which is pressurized during the inspiratory phase, and which is rapidly depressurized during the expiratory phase. As an example, gas under pressure would be supplied from the flow-switch of the mechanical respirator through suitable tubing into nipple 60 and chamber 57 where the pressure acts to move diaphragm 31 and plunger 29 to the right until plunger distal end 51 engages closure member 28 holding it firmly against valve seat 19 throughout the inspiratory phase. When the flow-switch of the respirator closes for the expiratory phase, the pressure in chamber 57 quickly dissipates through nipple 61 connected with suitable tubing with a gas jet, not shown, of the nebulizer in the respirator. As the pressure against diaphragm 31 is reduced to ambient, diaphragm 31 returns to a relaxed neutral position away from seat 19, leaving only the closure force of spring 32 to function against expiratory gases. Diaphragm 31 is placed in its neutral position such that its elastic forces move distal plunger end 51 away from closure 28 immediately upon the commencement of the expiratory phase, and these elastic forces cooperate in expelling gas pressures from chamber 57. This system provides a rapid dumping time for the patient during the expiratory cycle, thereby obviating the need for additional valve opening forces such as an auxilliary spring to urge diaphragm 31 away from closure 28 to achieve quick valve opening.

Exhalation gases moving through outlet port 22 normally will move unrestricted into ambient air. However, for certain patients it will be desirable to provide a retard cap 62 to restrict the expiratory flow and slow or prolong deflation of the lungs. Retard cap 62 comprises an integral hollow cylinder 63 and end wall 64 secured to the exhalation valve by means of flexible cord 66. A plurality of apertures 67 of graduated sizes are formed in cylinder 63 for registry with a single slot 68 formed in cylindrical outlet 21 of the exhalation valve housing. When retard of the expiratory flow is desired cap 62 is fitted over outlet 21 and adjusted until the desired outlet orifice size of openings 67 over slot 68 is attained. All variation of orifice size between the smallest and largest apertures 67 is obtained by rotating retard cap 62 to partially or completely occlude each aperture 67 or obtain full opening of any one of the same, as desired. There is a small permanent orifice at 70 to prevent inadvertent complete occlusion of expiratory gases as a safety measure.

The use and operation of exhalation valve apparatus 10 is as follows. Assume that the exhalation valve apparatus is assembled for use with a conventional mechanical respirator having a Tee 11 adapted for connection with a suitable patient adaptor. Nipple 60 of fitting 59 is connected with the flow-switch valve of the respirator and nipple 61 is connected with the nebulizer gas jet of the respirator. With the respirator in operation the patient is inhaling gases through the mainstream passage of Tee 11. At this time gas under pressure is directed through nipple 60 into chamber 57 moving diaphragm 31 and plunger 29 in a direction seating closure member 28 against valve seat 19 with a force sufficient to prevent escape of the inspiratory gases through the exhalation valve. When the respirator switches to the expiratory phase by closing of the flow-switch, pressure in chamber 57 quickly dissipates through nipple 61 and the nebulizer gas jet. The flow of expiratory gases acts against closure member 28 and the force of coil spring 32 to move the closure member to the left. The plunger and diaphragm move out of the way as described before. The expiratory gases flow past the rounded valve head 41 and through outlet port 22. As terminal expiratory flows are reached the force of spring 32 is effective to overcome the gas pressures to urge the closure member to its seated position. Valve stem 39 is free to return during this valve closure stage through its lost-motion connection with plunger 29.

For removal of the various elements of the valve and sterilization thereof valve cap 33 is first unscrewed from housing 14. Cartridge 26 may then be easily removed by grasping and pulling on diaphragm handle 34. With the cartridge free of the housing its elements are separated by pulling the closure member and diaphragm handle apart until stem annulus 54 snaps over plunger shoulder 53 permitting the closure member, coil spring and central support to be separated from the unitary diaphragm and plunger. After the elements are cleaned and sterilized, the cartridge is reassembled by a reversal of the foregoing steps, reinserted into the housing and locked in place by screwing valve cap 33 into position.

While the embodiment herein at present is considered to be preferred, it is understood that numerous variations and modifications may be made therein by those skilled in the art, and it is intended to cover in the appended claims all such variations and modifications as fall within the true spirit and scope of the invention.

We claim:

1. Exhalation valve apparatus for use with a respirator having an inhalation phase and an exhalation phase in its operative cycle, the apparatus comprising the combination of a housing having an inlet and an outlet in communication with each other, a valve seat formed in the inlet and a removable cartridge mounted in the housing, said cartridge including a body, a plunger, a valve head slidably mounted on the plunger and adapted to be moved between open and closed positions with respect to said seat, yieldable means carried by the body and engaging the valve head for yieldably urging the valve head toward said closed position, resilient diaphragm means engaging the plunger and the body and serving as the sole means for yieldably urging the plunger in a direction away from said valve head.

2. Apparatus as in claim 1 in which said diaphragm means is fabricated from a material creating a yieldable tension force urging the diaphragm and plunger in said direction away from said valve head.

3. Apparatus as in claim 1 in which said valve head is defined by a surface of revolution generated by a curve of constant radius convex with respect to the valve seat.

4. Exhalation valve apparatus for use with a respirator having an inhalation phase and an exhalation phase in its operative cycle, the apparatus comprising the combination of a housing having an inlet adapted to be connected with the respirator and an outlet adapted to be connected with ambient air, valve means in the housing to control the flow of expiratory gasses from the inlet to the outlet including a valve seat, valve closure means mounted within the housing for movement to and from the valve seat, plunger means mounted in the housing for movement to and from the valve closure means, a central support removably mounted in the housing and having a distal end spaced from the valve seat, said plunger means being mounted for axial movement relative to the support and said valve closure means being mounted for axial sliding movement on the plunger means, the closure means including a cylindrical skirt substantially enclosing the distal end of the support and means axially aligning the skirt with respect to the support distal end, lost-motion connection means mounting the closure means on the plunger for movement within a given range of axial travel, and pressure responsive means in operating connection with the plunger means, the pressure means comprising a pressure chamber, a flexible diaphragm mounted in the chamber and connected with an end of the plunger, the diaphragm being adapted to move between a first position with the chamber substantially depressurized for moving the plunger from the valve closure means and a second position responsive to gas pressure in the chamber to urge the closure means to occlude the valve seat and prevent flow there-through during the inspiratory phase.

5. Apparatus as in claim 4 in which the means aligning the valve closure skirt comprises a plurality of circumferentially positioned longitudinally extending rib members formed on the outer periphery of the central support and radially spaced from the inner surface of the skirt to provide a plurality of bearing surfaces therewith.

6. Apparatus as in claim 4 in which the valve closure means comprises a closure member including a valve head and a central valve stem having a rearwardly extending hollow distal end and an intrusive annulus formed on said distal end, said plunger having a distal end projecting forwardly within said stem distal end and a radially outwardly projecting shoulder adapted to cooperate with said intrusive annulus to releasably lock the closure member with respect to the plunger.

7. Apparatus as in claim 6 in which said hollow stem is formed with at least one longitudinal slot at its distal end, the slot extending into the area of the intrusive annulus affording outward flexing of the stem distal end to facilitate assembly and disassembly of the plunger therewith.

8. Apparatus as in claim 1 wherein the lost-motion connection means comprises a pair of axially spaced abutments on the plunger and the valve closure means includes a hollow valve stem enclosing an end of the plunger together with an intrusive annulus on the stem distal end positioned for movement between said plunger abutments to define said range of travel.

9. Apparatus as in claim 1 in which said flexible diaphragm is formed with a central hub constrained for movement with said plunger means, and means to pressurize said chamber on a side of the diaphragm for urging said plunger means in engagement with said closure means during the inspiratory phase, and to dissipate said pressure in the chamber during the expiratory phase.

10. Exhalation valve apparatus for use with a respirator having an inhalation phase and an exhalation phase in its operative cycle, the apparatus comprising the combination of a housing, a cartridge removably mounted in the housing, a cap removably secured to the housing and retaining the cartridge within the housing, said housing having an inlet adapted to be connected with the respirator and an outlet adapted to be connected with ambient air, said housing being formed with a valve seat in the inlet, said cartridge including a central support body, a plunger disposed in said body, valve closure means mounted on the plunger for limited axial movement with respect to the plunger within the body for movement between open and closed positions with respect to the valve seat, yieldable spring means disposed in the body and engaging the body and the valve closure means to yieldably urge the valve closure means towards a closed position, a flexible diaphragm secured to the plunger, and having its outer margin secured between the cap and the body so that chambers are formed on opposite sides of the diaphragm, the diaphragm being normally in a first position permitting the valve closure means to move to the open position and assuming a second position in response to gas pressure in one of said chambers to prevent said valve closure means from moving to an open position.

11. Apparatus as in claim 10 wherein the diaphragm includes an integral handle affording manual grasping thereof for removal of the cartridge as a unit from the housing with said valve cap removed.

* * * * *